United States Patent
Hoglund et al.

(10) Patent No.: US 10,728,517 B2
(45) Date of Patent: Jul. 28, 2020

(54) PARALLAX MITIGATION FOR MULTI-IMAGER SYSTEMS AND METHODS

(71) Applicant: FLIR Systems AB, Taby (SE)

(72) Inventors: John Hoglund, Vallentuna (SE); Bengt Ehrenkrona, Bromma (SE)

(73) Assignee: FLIR Systems AB, Täby (SE)

( * ) Notice: Subject to any disclaimer, the term of this patent is extended or adjusted under 35 U.S.C. 154(b) by 0 days.

(21) Appl. No.: 16/208,154

(22) Filed: Dec. 3, 2018

(65) Prior Publication Data
US 2019/0199994 A1 Jun. 27, 2019

Related U.S. Application Data

(60) Provisional application No. 62/610,118, filed on Dec. 22, 2017.

(51) Int. Cl.
| | | |
|---|---|---|
| H04N 13/128 | (2018.01) | |
| H04N 13/25 | (2018.01) | |
| H04N 13/296 | (2018.01) | |
| H04N 13/239 | (2018.01) | |
| H04N 5/33 | (2006.01) | |
| H04N 13/00 | (2018.01) | |

(52) U.S. Cl.
CPC ......... *H04N 13/128* (2018.05); *H04N 13/239* (2018.05); *H04N 13/25* (2018.05); *H04N 13/296* (2018.05); *H04N 5/33* (2013.01); *H04N 2013/0081* (2013.01); *H04N 2213/001* (2013.01)

(58) Field of Classification Search
CPC ............... H04N 13/239; H04N 13/25; H04N 2013/0081
See application file for complete search history.

(56) References Cited

U.S. PATENT DOCUMENTS

| | | | | |
|---|---|---|---|---|
| 2007/0002159 A1* | 1/2007 | Olsen | ............... | H01L 27/14621 348/335 |
| 2010/0328456 A1* | 12/2010 | Alakarhu | ............... | G01C 3/08 348/139 |
| 2013/0050453 A1* | 2/2013 | Bergstrom | ............ | H04N 5/2258 348/61 |
| 2013/0083199 A1* | 4/2013 | Choi | ..................... | H04N 5/332 348/164 |
| 2013/0300875 A1 | 11/2013 | Strandemar et al. | | |
| 2013/0342691 A1* | 12/2013 | Lewis | ..................... | H04N 5/332 348/143 |
| 2014/0078283 A1* | 3/2014 | Nistico | ................ | A61B 3/0008 348/78 |
| 2014/0346359 A1* | 11/2014 | Holliday | .............. | H04N 13/111 250/340 |
| 2015/0334315 A1* | 11/2015 | Teich | ................... | H04N 5/2257 348/164 |
| 2015/0358560 A1* | 12/2015 | Boulanger | ............ | H04N 5/332 348/164 |

(Continued)

*Primary Examiner* — Mainul Hasan
(74) *Attorney, Agent, or Firm* — Haynes and Boone, LLP (57) ABSTRACT

A method for facilitating parallax mitigation includes capturing a first image of a scene using a first imaging device, where the first imaging device is associated with a first optical axis. The method further includes tilting a second optical axis associated with a second imaging device to obtain a tilted optical axis. The method further includes capturing a second image of the scene using the second imaging device and the tilted optical axis.

18 Claims, 6 Drawing Sheets

(56) References Cited

U.S. PATENT DOCUMENTS

2015/0373279 A1* 12/2015 Osborne ............ G02B 13/0075
348/36
2016/0316154 A1* 10/2016 Elmfors ................ G01J 5/0025
2017/0374253 A1* 12/2017 Cahall .................. H04N 5/2254

* cited by examiner

PARALLAX MITIGATION FOR MULTI-IMAGER SYSTEMS AND METHODS

CROSS REFERENCE FOR RELATED APPLICATIONS

This application claims the benefit of and priority to U.S. Provisional Patent Application No. 62/610,118 filed Dec. 22, 2017 and entitled "PARALLAX MITIGATION FOR MULTI-IMAGER SYSTEMS AND METHODS," which is incorporated herein by reference in its entirety.

TECHNICAL FIELD

One or more embodiments relate generally to imaging devices and more particularly, for example, to parallax mitigation for multi-imager systems and methods.

BACKGROUND

Multiple imaging devices (e.g., also referred to as imagers) may each be used to capture an image of an object in a scene. An apparent position of the object in the scene may differ from image to image due to parallax resulting from displacement between optical axes of the imaging devices. For example, in a case with two imaging devices, parallax may increase as a distance between the optical axes of the two imaging devices increases.

SUMMARY

In one or more embodiments, a method includes capturing a first image of a scene using a first imaging device. The first imaging device is associated with a first optical axis. The method further includes tilting a second optical axis associated with a second imaging device to obtain a tilted optical axis. The method further includes capturing a second image of the scene using the second imaging device and the tilted optical axis.

In one or more embodiments, an imaging system includes a first imaging device configured to capture a first image of a scene. The first imaging device has a first optical axis. The imaging system further includes a second imaging device configured to capture a second image of the scene using a tilted optical axis. The second imaging device has a second optical axis. The imaging system further includes a lens disposed in front of the second imaging device, where the lens is configured to tilt the second optical axis to obtain the tilted optical axis.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims. The components in the figures are not necessarily to scale, emphasis instead being placed upon clearly illustrating the principles of the present disclosure.

Figure 1:
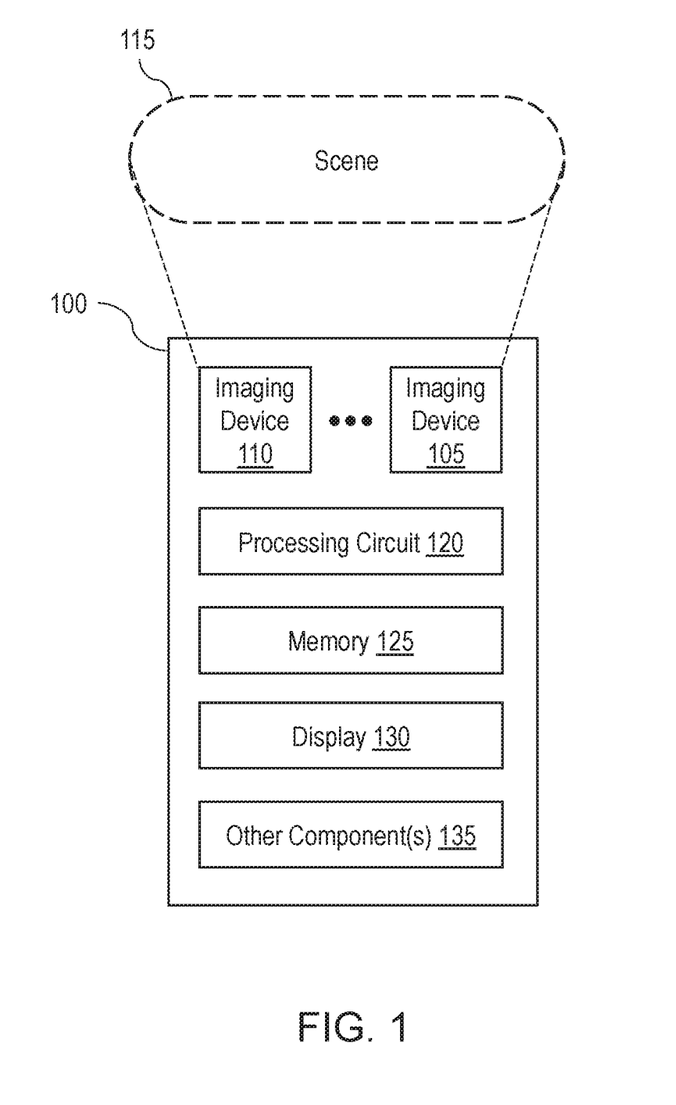
FIG. 1 illustrates a block diagram of an example imaging system in accordance with one or more embodiments of the present disclosure.

FIG. 1 illustrates a block diagram of an example imaging system 100 in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided.

The imaging system 100 includes an imaging device 105, an imaging device 110, a processing circuit 120, memory 125, a display 130, and other components 135. The imaging devices 105 and 110 may capture images by detecting image data and generating pixel values of the images based on the detected image data. The detected image data may be in the form of electromagnetic (EM) radiation captured (e.g., detected, sensed) by a detector circuit of the imaging devices 105 and 110. For example, the detector circuit may include a focal plane array (FPA). The detector circuit of the imaging devices 105 and 110 may capture (e.g., be sensitive to) a portion of the EM spectrum, such as visible-light, infrared, x-ray, ultraviolet, and so forth. In an embodiment, using the imaging devices 105 and 110, the imaging system 100 may image and/or monitor a real-world scene such as scene 115 or portion thereof (e.g., one or more objects/features of interest in the scene 115). In some cases, the imaging devices 105 and 110 may each include an appropriate filter(s) to pass components of EM radiation within a desired wavelength range and block other components of EM radiation, and/or optical element(s) (e.g., mirror, lens) to guide components of the EM radiation to the FPA of the imaging devices 105 and 110.

It is noted that the ellipses between the imaging device 105 and the imaging device 110 indicate that one or more additional imaging devices are between the imaging devices 105 and 110 or no imaging devices are present between the imaging devices 105 and 110. In some embodiments, the imaging system 100 may include at least two imaging devices, which may include one or more infrared (IR) imaging devices, one or more visible light imaging devices, and/or one or more imaging devices for capturing electromagnetic radiation of other wavelengths of interest (e.g., ultraviolet, x-ray). In these embodiments, the imaging system 100 may facilitate parallax mitigation for the imaging devices. Such parallax may result from displacements in optical axes (or equivalently displacements in fields of view) of the imaging devices.

In some aspects, the imaging device 105 may be an IR imaging device that includes an IR detector and an associated readout circuit (e.g., a readout integrated circuit (ROTC)). The imaging device 105 may capture (e.g., detect, sense) IR radiation with wavelengths in the range from around 700 nm to around 1 mm, or portion thereof. For example, in some cases, the imaging device 105 may be sensitive to (e.g., better detect) mid-wave IR (MWIR) radiation (e.g., electromagnetic radiation with wavelength of 2-5 µm) and/or long-wave IR (LWIR) radiation (e.g., electromagnetic radiation with wavelength of 7-14 µm). In some cases, LWIR radiation may also be referred to as thermal radiation or thermal IR radiation. By way of non-limiting examples, the IR detector may include a microbolometer FPA or a photon detector FPA. For example, a microbolometer FPA may include IR detecting materials such as amorphous silicon (a-Si), vanadium oxide ($VO_x$), a combination thereof, and/or other detecting material(s).

In some cases, the imaging device 105 may include one or more filters adapted to pass IR radiation of some wavelengths but substantially block IR radiation of other wavelengths (e.g., MWIR filters, thermal IR filters, and narrow-band filters). Such filters may be utilized to tailor the imaging device 105 for increased sensitivity to a desired band of IR wavelengths. In an aspect, an IR imaging device may be referred to as a thermal imaging device when the IR imaging device is tailored for capturing thermal IR images. Other imaging devices, including IR imaging devices tailored for capturing infrared IR images outside the thermal range, may be referred to as non-thermal imaging devices.

In some aspects, the imaging device 105 may be a visible-light imaging device responsive to visible light. For example, the visible-light imaging device may be implemented with a charge-coupled device (CCD) sensor, an electron multiplying CCD (EMCCD) sensor, a complementary metal-oxide-semiconductor (CMOS) sensor, a scientific CMOS (sCMOS) sensor, an intensified charge-coupled device (ICCD), and/or other sensors. In some cases, the imaging device 105 may include one or more filters adapted to pass visible-light radiation of some wavelengths (e.g., colors) but substantially block other visible-light radiation.

The imaging device 110 and/or any other imaging devices (if present) of the imaging system 100 may be utilized to capture images based on a portion of the EM spectrum similar to or different from that of the imaging device 105. In some embodiments, the imaging device 105 may be an IR imaging device, such as a thermal imaging device, and the imaging device 110 may be a visible-light imaging device.

The processing circuit 120 may perform operations to process pixel values captured by the imaging devices 105 and 110 (e.g., detectors of the imaging devices 105 and 110). By way of non-limiting examples, the processing circuit 120 may perform operations such as non-uniformity correction (NUC), spatial and/or temporal filtering, distortion correction, and/or other operations on the pixel values. For instance, such operations may be performed prior to displaying an image to a user. In an embodiment, the processing circuit 120 may combine (e.g., blend, fuse) multiple images to generate a combined image.

In some aspects, such as when the imaging devices 105 and/or 110, and/or components thereof, are movable, the processing circuit 120 may generate control signals and provide the control signals to cause appropriate movement. In some cases, such control signals may be provided to electrical and/or mechanical mechanisms (e.g., motors, actuators) contained in or coupled to the imaging devices 105 and/or 110 to cause appropriate movement. In some aspects, the imaging devices 105 and/or 110 may include optical elements and/or may have optical elements placed in proximity (e.g., in front of them) that may be moved (e.g., rotational motion, translational motion) and/or swapped in or out. The optical elements may be part of a selectable optical element wheel for example. In these aspects, control signals from the processing circuit 120 may cause such movement and/or swapping in or out of the optical elements.

The processing circuit 120 may be implemented as any appropriate processing device, such as a central processing unit (CPU), a graphics processing unit (GPU), a digital signal processor (DSP), a logic device, a microcontroller, an application specific integrated circuit (ASIC), a programmable logic device (PLD), a combination thereof, and/or other device. The processing circuit 120 may include combinations of hardware and software processing functionality and may be provided with/in and/or communicatively coupled to other components to execute appropriate instructions, such as software instructions and/or processing parameters (e.g., characteristics of optical elements in a selectable optical element wheel, image fusing parameters, filtering coefficients, NUC correction terms) stored in the memory 125. In various embodiments, the processing circuit 120 may be configured to execute software instructions stored in the memory 125 to perform various methods, processes, or operations in the manner described herein.

The memory 125 may be utilized to store information for facilitating operation of the imaging system 100. The memory 125 may store information such as instructions to be executed by the various components (e.g., the processing circuit 120) of the imaging system 100, parameters associated with processing operations (e.g., image fusing parameters), information associated with previously generated images (e.g., for temporal filtering), and/or other information. By way of non-limiting examples, the memory 125 may include non-volatile memory, such as read-only memory (ROM), programmable ROM (PROM), erasable programmable ROM (EPROM), electrically erasable programmable (EEPROM), flash, non-volatile random-access memory (NVRAM), etc. The memory 125 may include volatile memory, such as random-access memory (RAM), dynamic RAM (DRAM), static RAM (SRAM), etc. In one embodiment, such as in environment monitoring applications, captured and/or processed images may be stored in the memory 125 and retrieved later for purposes of reviewing and/or further diagnosing conditions of an environment monitored by imaging system 100. In some aspects, the memory 125, or a portion thereof, may be external to the imaging system 100 (e.g., an external memory accessible by the imaging system 100).

The display 130 (e.g., screen, touchscreen, monitor) may be used to display captured and/or processed images and/or other images, data, and/or information (e.g., legend relating color in the images with temperatures). For example, the images (or a visual representation of the images) may be displayed as individual static images and/or as a series of images in a video sequence. In some cases, the display 130 may be used to display a combined image formed by combining two or more images. In one example, the combined image may be formed by combining an IR image and a visible-light image. In this example, in some cases, the combined image may be used to determine whether the IR image is properly aligned with the visible-light image.

In addition, the imaging system 100 may include other components 135. By way of non-limiting examples, the other components 135 may be used to implement any features of the imaging system 100 as may be desired for various applications, such as clocks, batteries, motion sensors, temperature sensors, communications components, and/or other components.

For example, motion sensors may be implemented by one or more accelerometers, gyroscopes, and/or other appropriate devices that may be used to detect movement of the imaging system 100. The information provided by the motion sensors may facilitate image processing operations (e.g., spatial filtering, temporal filtering) performed by the processing circuit 120, such as by facilitating differentiation between motion in the scene relative to motion of the imaging system 100. As another example, communications components may facilitate wired and/or wireless communication between components within the imaging system 100 and/or between the imaging system 100 and other systems. Examples of communications components may include components (e.g., interfaces, connections) for facilitating communication using Universal Serial Bus (USB), Ethernet, WiFi, Bluetooth, cellular, infrared, radio, and/or other wired or wireless protocols.

In some embodiments, the imaging device 105 is an IR imaging device (e.g., a thermal IR imaging device) and the imaging device 110 is a visible-light imaging device. The processing circuit 120 may receive IR images from the imaging device 105 and visible-light images from the imaging device 110 and fuse, superimpose, or otherwise combine the IR images and visible-light images. In some cases, the resulting combined images may have higher definition and/or contrast than the IR images or visible-light images can provide alone. For example, the processing circuit 120 may combine thermal images with visible-light images to generate combined images that contain radiometric data and/or other characteristics (e.g., visible-light characteristics, thermal IR characteristics) corresponding to a scene (e.g., 115), but with more object detail (e.g., contour and/or edge detail) and/or contrast than generally can be provided by the thermal or visible-light images alone. Combined images generated in this example may provide sufficient radiometric data, edge detail, and contrast to allow easier recognition and/or interpretation of the presence, location, and position of a detected object(s). In an aspect, an object may be, or may be referred to as, a feature or a component. An example of the combining of IR images with visible-light images is described with respect to FIG. 8.

In some embodiments, the imaging system 100 may facilitate parallax mitigation for the imaging devices 105 and 110, such as in cases that the imaging system 100 is at a close distance to an object or a feature that is imaged. In an embodiment, the imaging devices 105 and/or 110 may be tilted and/or an optical element added to tilt fields of view (e.g., or equivalently, optical axes) of the imaging devices 105 and/or 110 to facilitate parallax mitigation. Parallax mitigation may allow fusing of images (e.g., combining infrared images with visible-light images) even when imaging objects/features close to the imaging system 100. In some cases, objects/features considered to be close may be at a distance of around 500 mm or less from at least one of the imaging devices 105, 110, and/or other imaging devices (if any) of the imaging system 100.

In an aspect, a focus distance may refer to a distance relative to an imaging system (e.g., focal plane of the imaging system). For example, the focus distance may refer to a distance between an object being imaged and the imaging system. In a case that the imaging system includes multiple imaging devices, a focus distance may refer to a distance between an object and an imaging device closest to the object. In some applications, an object of interest may nominally be at a predetermined focus distance from an imaging device. By way of non-limiting examples, applications may include circuit board quality control applications, security applications, microscopy applications, and/or generally any applications in which objects of interest to be viewed/imaged may be at close distances (e.g., close predetermined focus distances) from an imaging device.

As one example, in a circuit board quality control application (or generally any manufacturing/fabricating), a determination may be made as to whether fabrication/setup of the circuit board is proper based at least on whether positions of various components are at their respective predetermined focus distances from one or more imaging systems. Different imaging systems may be used for different components and/or one or more imaging systems may be adjusted as appropriate for use with the different components (e.g., for determining whether the components are properly positioned). In one case, the object may be an alignment marker on a chip that can be used to facilitate performing of fabrication processes (e.g., lithography, deposition). More generally, the object may generally be any feature and/or component (e.g., chip component) that is intended/designed to be at the predetermined focus distance. As another example, in a microscopy application, the imaging system may be used as a microscope for viewing/imaging close objects, such as an electric circuit board. The object to be viewed by the imaging system may be at a predetermined focus distance between 50 mm to 100 mm from the imaging system. For example, the imaging system may be configured to view/image an object positioned 70 mm from the imaging system. In some cases, an alarm may be set up that goes off (e.g., notifies a user) when an object moves from its original distance.

In some aspects, a determination may be made that the object is correctly positioned at the predetermined focus distance when the IR image and the visible-light image are aligned or substantially aligned. When aligned or substantially aligned, the images generally appear focused. When the images are determined to not be aligned or substantially aligned, the object may be determined to not be positioned correctly. Alternatively or in addition, such alignment (or lack thereof) may be utilized to determine whether imaging devices are appropriately positioned to facilitate parallax mitigation (e.g., as part of an imaging system calibration process). For example, in a microscopy application, a fixed focus position may be set during a setup or calibration process, such that images (e.g., IR and visible-light images) that are aligned are in focus. By contrast, a combined image based on captured IR and visible-light image may appear out of focus when the object is not at the predetermined focus distance and/or the FOVs of the imaging devices (e.g., with or without intervening lenses) are not oriented properly.

Alignment may be evaluated in autofocus and/or using the combined image. In some aspects, image analytics may be applied on the combined image, IR image, and/or visible-light image for purposes of identifying presence (or lack of presence) of issues associated with parallax, image registration and/or alignment, and/or others, performing feature detection and/or matching, determining image quality, and/or other performing operations to determine whether alignment is proper.

Figure 2:
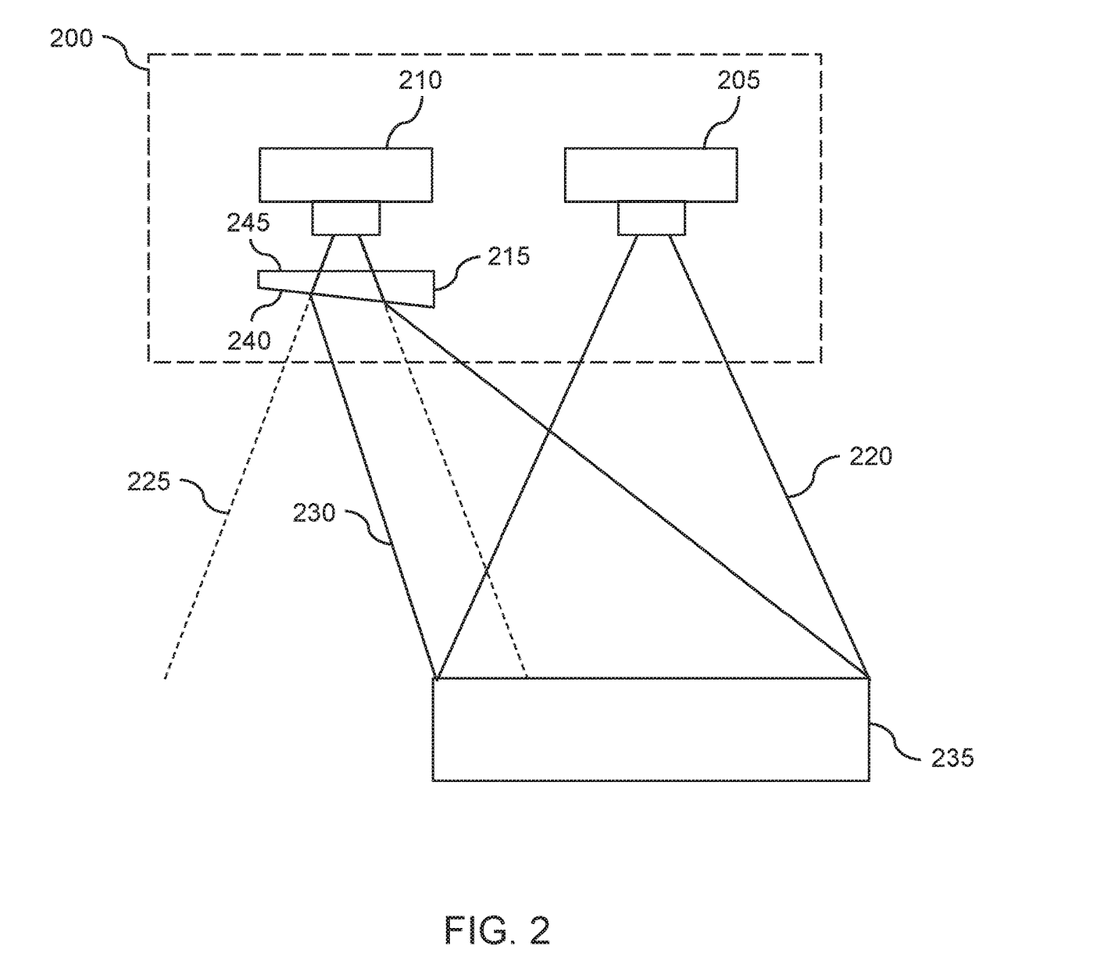
FIG. 2 illustrates an example dual imaging system in accordance with one or more embodiments of the present disclosure.

FIG. 2 illustrates an example dual imaging system 200 in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided.

The dual imaging system 200 includes an IR imaging device 205 (e.g., IR camera), a visible-light imaging device 210 (e.g., visible-light camera), and a prism lens 215 (e.g., also referred to as a prism). An example distance range between the imaging devices 205 and 210 may be from 10 mm to 20 mm. A housing of the dual imaging system 200 may be represented by the dotted box. In some cases, the housing of the dual imaging system 200 may include a window(s), a filter(s), and/or an aperture(s) to allow light to be received by the IR imaging device 205 and the visible-light imaging device 210 (e.g., via the prism lens 215). The IR imaging device 205 has a field of view (FOV) 220 and the visible-light imaging device 210 has an FOV 225 (depicted with dotted lines). The prism lens 215 may be positioned in front of the visible-light imaging device 210 to move (e.g., redirect) the FOV 225 of the visible-light imaging device 210 to an FOV 230. In this regard, in moving the FOV, an optical axis of the visible-light imaging device 210 is moved (e.g., redirected) by the prism lens 215.

As shown in FIG. 2, the FOV 230 coincides with the FOV 220 of the IR imaging device 205. By moving the FOV 225 of the visible-light imaging device 210 to the FOV 230 using the prism lens 215, the visible-light imaging device 210 and the IR imaging device 205 may capture (e.g., simultaneously capture) visible-light images and IR images, respectively, that encompass an object 235 of interest with reduced or no parallax. The object 235 may be a portion of a scene, a feature in a scene, or generally anything that can be imaged using the imaging devices 205 and 210. For example, the object 235 may be an alignment marker on a chip. As such, the visible-light images and infrared images are aligned or substantially aligned with reduced or no additional processing to effectuate such aligning, relative to a case in which the prism lens 215 is not utilized. In some aspects, such aligning of the visible-light images and IR images may facilitate combining (e.g., fusing, blending) of the visible-light images with the corresponding IR images.

In an embodiment, the prism lens 215 may move the FOV 225 to the FOV 230 to allow image captures of the object 235 by both the IR imaging device 205 and the visible-light imaging device 210 even when the object 235 is at a close distance to the imaging devices 205 and 210. For example, a focus distance to the object 235 may be between 50 mm and 100 mm. At such a close distance, the parallax associated with the distance between the imaging devices 205 and 210 may cause the imaging devices 205 and 210 to capture different portions of a scene with little overlap. In some cases, the object 235 may be considered to be close when the object 235 is at a distance of around 500 mm or less from the imaging device 205. As shown in FIG. 2, the imaging devices 205 and 210 are unable to both capture the object 235 without moving the FOV of one or both of the imaging devices 205 and 210. In this example, when the IR imaging device 205 is positioned to capture the object 235 (e.g., the object 235 is encompassed by the FOV 220 of the infrared imaging device 205), the FOV 225 of the visible-light imaging device 210 is able to capture only a small portion of the object 235. Due to an absence of captured visible-light image data of the object 235, the images captured by the imaging devices 205 and 210 are not amenable to aligning and fusing. By using the prism lens 215, the FOVs 220 and 230 coincide to allow imaging of objects close to the imaging devices 205 and 210. In cases where objects are farther from the imaging devices 205 and 210, the FOVs of the imaging devices 205 and 210 (absent the prism lens 215) may overlap sufficiently to allow mixing of images. In such cases, the imaging devices 205 and/or 210 may be refocused when the prism lens 215 is removed.

In capturing image data of the object 235, the IR imaging device 205 and visible-light imaging device 210 may include IR detectors and visible-light detectors sensitive to IR image data (e.g., IR radiation) and visible-light image data, respectively, associated with the object 235. The infrared imaging device 205 may directly receive the IR image data. The visible-light radiated by the object 235 may be incident on an angled surface 240 of the prism lens 215. In response to the incident visible light radiating from the object 235, a portion of the visible light may be reflected off the angled surface 240 of the prism lens 215 (e.g., reflected in a direction away from the imaging device 210) and transmit (e.g., pass) a portion of the visible light into the prism lens 215 and toward a flat surface 245 of the prism lens 215. In response to visible light incident on the flat surface 245, a portion of the visible light may be reflected off the flat surface 245 and a portion transmitted through the flat surface 245 and to the visible-light imaging device 210. In this regard, the angled surface 240 of the prism lens 215 faces the object 235, and the flat surface 245 of the prism lens 215 faces the visible-light imaging device 210.

In an aspect, with the configuration shown in FIG. 2, the visible-light imaging device 210 receives a portion of the visible light transmitted through the prism lens 215 and does not receive a portion of the visible light reflected by the prism lens 215. Such a configuration is in contrast to a periscope-type system, in which the reflected portion of light from a prism lens is captured by an imaging device. In one case, the prism lens 215 may be polished to provide sharper visible-light images, such as by reducing or eliminating distortion in visible-light images that is attributable to the prism lens 215.

Figure 3A:
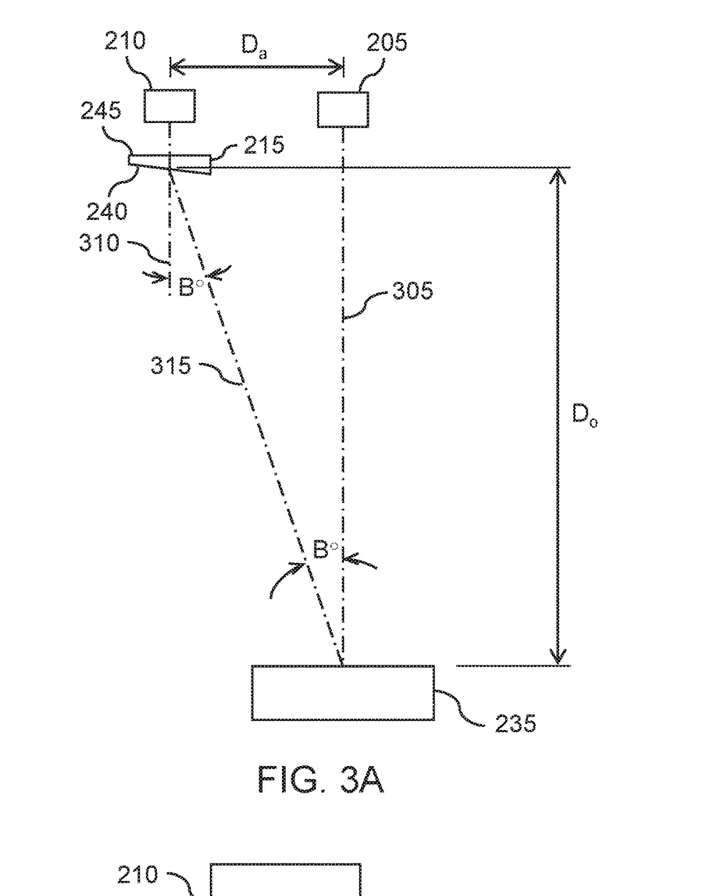
FIG. 3A illustrates example angles and distances associated with the dual imaging system of FIG. 2 in accordance with one or more embodiments of the present disclosure.
Figure 3B:
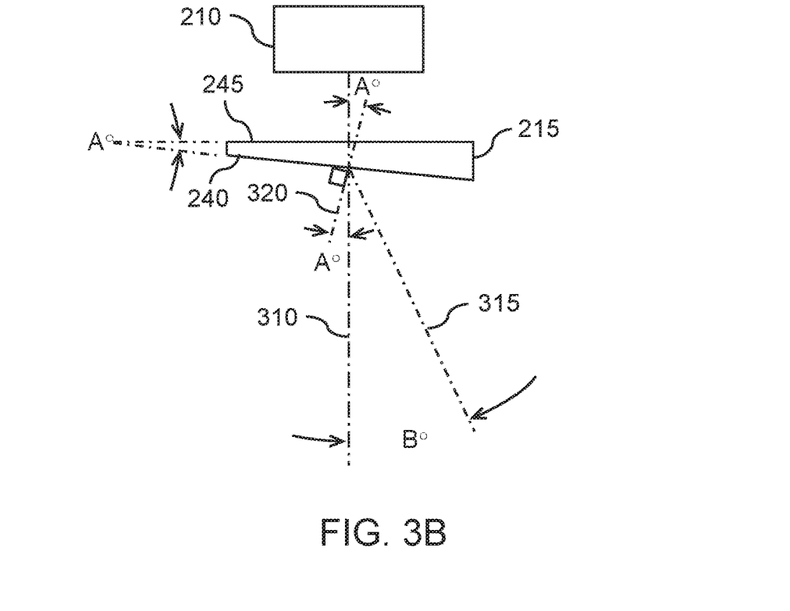
FIG. 3B illustrates a close-up view of a portion of FIG. 3A.

FIG. 3A illustrates example angles and distances associated with the dual imaging system 200 of FIG. 2 in accordance with one or more embodiments of the present disclosure. FIG. 3B illustrates a close-up view of a portion of FIG.

3A. The IR imaging device 205 has an optical axis 305 and the visible-light imaging device 210 has an optical axis 310. The prism lens 215 directs the optical axis 310 of the visible-light imaging device 210 to an optical axis 315. In an aspect, the optical axis 315 may be referred to as a tilted optical axis of the visible-light imaging device 210. The optical axes 305 and 315 intersect on a surface of the object 235. In some cases, the optical axis 310 may be substantially parallel (e.g., within ±2° of being parallel) with the optical axis 305.

In FIG. 3A, $D_o$ is a distance between the prism lens 215 (e.g., a center of the angled surface 240 of the prism lens 215 facing the object 235) and the object 235 (e.g., a surface of the object 235), and $D_a$ is a distance between the optical axes 305 and 310 of the imaging devices 205 and 210, respectively. The distance $D_o$ may be referred to as a focus distance or focal distance. The distance $D_a$ may be associated with, or may be referred to as, a parallax resulting from displacement between the imaging devices 205 and 210. As an example, a distance $D_a$ may be between 10 mm to 20 mm, and/or a distance $D_o$ may be between 60 mm and 90 mm.

An angle A° is an angle of the angled surface 240 of the prism lens 215. The angle A° is also an angular distance between the optical axis 310 and an axis 320 normal to the angled surface 240. An angle B° is an angular distance between the optical axis 310 and the tilted optical axis 315 of the visible-light imaging device 210. In FIGS. 2 and 3A-3B, the prism lens 215 may be positioned and angled to cause the optical axes 305 and 315 to intersect at the distance $D_a$. In this regard, with reference back to FIG. 2, such an angle causes the FOV 225 of the visible light imaging device 210 to be moved to the FOV 230 to coincide with the FOV 220 of the infrared imaging device 205. In this case, the angle B° may be set to allow imaging of an object at a distance $D_a$ away from the imaging device 205. The angle B° may be determined empirically and/or using tan (B°) $=D_a/D_o$. The angle A° may be determined empirically and/or using Snell's Law. Snell's Law provides that $n_1 \sin(A°)=n_2 \sin(A°)+B°$, where $n_1$ is the index of refraction of the prism lens 215 and $n_2$ is the index of refraction of the medium (e.g., air) surrounding the prism lens 215. In this regard, the prism lens 215 tilts the optical axis 310 of the visible-light imaging device 210 by an angle A°+B° relative to the axis 320 normal to the angled surface 240 of the prism lens 215 in order for the angle between the optical axis of 305 of the IR imaging device 205 and the tilted optical axis 315 of the visible-light imaging device 210 to be B°.

As an example, the IR imaging device 205 and visible-light imaging device 210 may be part of a calibrated camera core. The prism lens 215 may be surrounded by air (i.e., $n_2 \approx 1$) and may be formed of plastic material with $n_1=1.5$. The distance $D_a$ between the imaging devices 205 and 210 (e.g., between the optical axes 305 and 310) may be 13.5 mm. The distance $D_o$ may be 70 mm. Using tan (B°)=$D_a/D_o$, B°=10.9°. Using $n_1 \sin(A°)=n_2 \sin(A°)+B°$, A°=20.0°. With the angle A°=20.0°, the prism lens 215 may allow substantial overlap in the FOVs of the imaging devices 205 and 210 to allow imaging of objects that have a distance of around $D_a$ from the prism lens 215, as shown by the FOVs 220 and 230 in FIG. 2.

Although the prism lens 215 of FIGS. 2 and 3A-3B has an angled surface and a flat surface, in some cases the prism lens 215 may have an angled surface facing the object 235 and another angled surface facing the visible-light imaging device 210. In some embodiments, alternatively or in addition to the prism lens 215, generally any light refracting optical element that is off-center (e.g., off-axis) relative to the optical axis of the visible-light imaging device 210 may be utilized to move the optical axis (e.g., or equivalently the FOV) of the visible-light imaging device 210. As an example, an off-center lens may be utilized. Furthermore, although the foregoing moves the FOV of the visible light imaging device 210, in some embodiments the FOV of the infrared imaging device 205 may be moved alternative to or in addition to moving the FOV of the visible light imaging device 210. To effectuate such movement, the IR imaging device 205 and/or visible light imaging device 210 may utilize a respective lens, and/or the IR imaging device 205 and/or 2s visible-light imaging device 210 may be moved (e.g., tilted).

Figure 4:
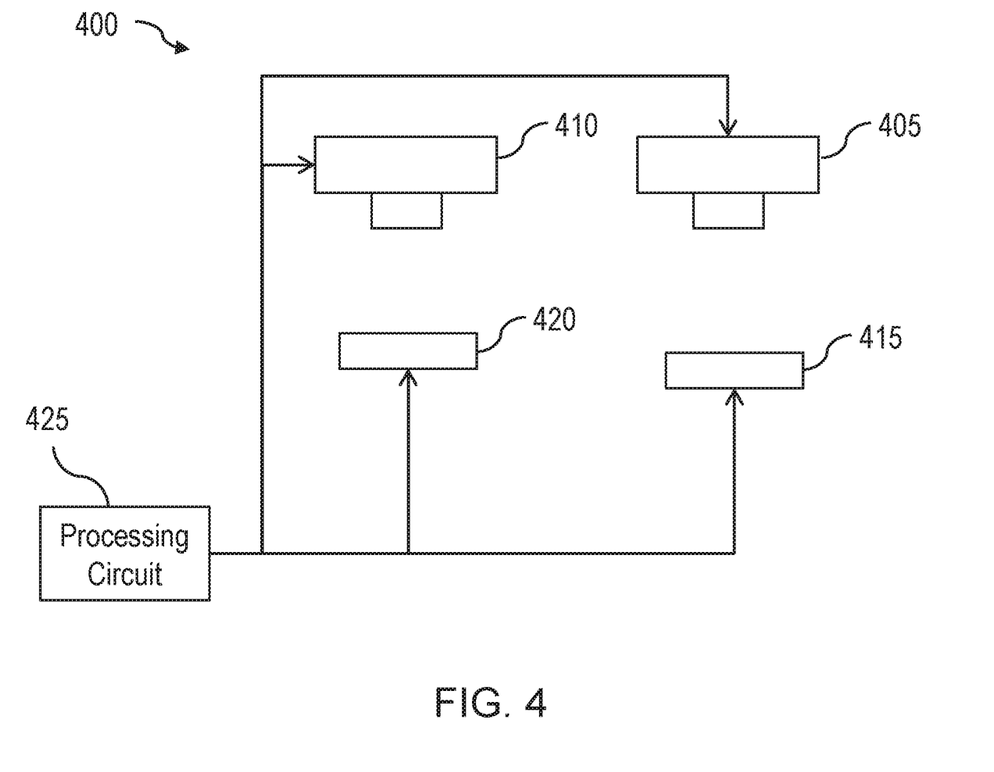
FIG. 4 illustrates an example dual imaging system in accordance with one or more embodiments of the present disclosure.

For example, FIG. 4 illustrates an example dual imaging system 400 in accordance with one or more embodiments of the present disclosure. The dual imaging system 400 includes an IR imaging device 405, a visible-light imaging device 410, a lens 415, and a lens 420. In some cases, the lenses 415 and 420 may have material appropriate to facilitate IR and visible light imaging, respectively. The dual imaging system 400 may include and/or may be coupled to a processing circuit 425. In an aspect, the processing circuit 425 may be, may include, or may be a part of the processing circuit 120 of FIG. 1.

The IR imaging device 405, visible-light imaging device 410, lens 415, and/or lens 420 may be movable. In some cases, the lens 415 and/or lens 420 may be removed from or moved back into the dual imaging system 400 (e.g., depending on a user's application). Such movement may be manually performed (e.g., by a user) or via control signals from the processing circuit 425. In some cases, the IR imaging device 405, visible-light imaging device 410, lens 415, and/or lens 420 may include or may be coupled to electrical and/or mechanical mechanisms (e.g., actuators, motors) that can move (e.g., rotational and/or translational movement) these components. For example, the IR imaging device 405 and/or visible-light imaging device 410 may be adjusted up or down (e.g., manual and/or automated movement) on a stand shaft.

It is noted that not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided. In this regard, although various techniques are implemented together in FIG. 4 to move the FOVs of the imaging devices 405 and/or 410, a subset of such techniques, or other techniques, may be utilized to move one or more of the FOVs. For example, in some cases, the lenses 415 and/or 420 may be movable while the imaging devices 405 and/or 410 are fixed in position.

In an embodiment, an imaged object (e.g., 235) may nominally be at a predetermined position. In this regard, a distance between an imaging system (e.g., 200) and the object may be fixed (e.g., within tolerance levels). An example application may be a circuit board quality control, in which an object is to be positioned at a desired focus distance. The object may be an alignment marker on a chip that can be used to facilitate performing of fabrication processes (e.g., lithography, deposition). The distance may be within ±10% from a nominal distance between the imaging system and the object. As an example, the nominal distance between the imaging system and the imaged object may be around 80 mm±8 mm.

With reference to FIGS. 2 and 3A-3B, in some cases, an alignment of the IR images captured by the IR imaging device 205 and the visible-light images captured by the visible-light imaging device 210 may be utilized to determine whether the object 235 is correctly positioned at the predetermined position and/or whether the prism lens 215, IR imaging device 205, and/or visible-light imaging device 210 are appropriately positioned to facilitate parallax mitigation (e.g., as part of an imaging system calibration process). Since the FOVs coincide, distortion of the IR images and/or visible-light images (e.g., due to the prism lens 215) is generally small and may be corrected as appropriate.

Figure 5:
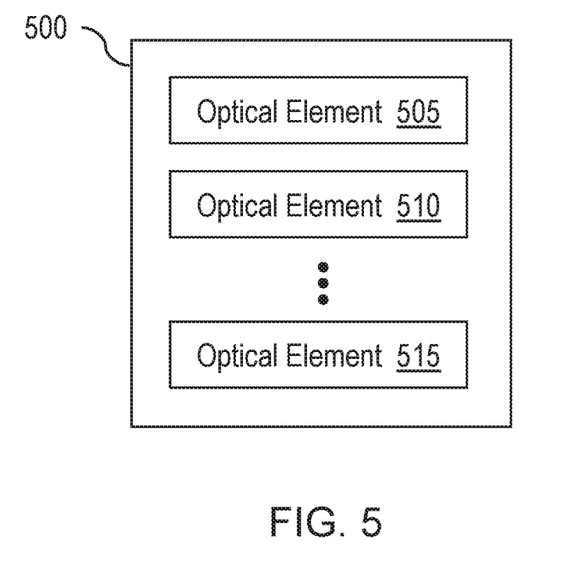
FIG. 5 illustrates an example optical element wheel in accordance with one or more embodiments of the present disclosure.

In this regard, a light refracting optical element, such as the prism lens 215, may be utilized to image objects at a certain nominal distance or within a certain nominal distance range from an imaging system. To allow imaging of objects at other focus distances, the light refracting optical element may be exchanged for (e.g., swapped out for) a different light refracting optical element (e.g., prism lens with different angled surface). Different light refracting optical elements may be utilized to facilitate imaging of objects at different focus distances and may cause different adjustments (e.g., apply different tilts) to an imaging device's FOV. In some cases, such exchanging of light refracting optical elements may be done manually (e.g., by a user), and/or via control of electrical and/or mechanical mechanisms to replace the light refracting optical elements. For example, control signals (e.g., from the processing circuit 120) may cause the electrical and/or mechanical mechanisms to remove a light refracting optical element from the FOV 225 of the visible-light imaging device 210 and move a new light refracting optical element in front of the visible light imaging device 210. The light refracting optical elements (e.g., lenses, prism lenses) may be provided as part of an optical element wheel used to swap in and swap out light refracting optical elements (e.g., manually and/or via control signals).

Thus, in some embodiments, a lens or other light refracting optical element utilized for a focus distance range may be exchanged for another optical element to facilitate imaging associated with other focus distance ranges. An optical element may include a prism lens, other type of lens, or generally any optical element that can be positioned relative to an imaging device to move an FOV of the imaging device. Such exchange of optical elements may be done manually (e.g., by a user) or through control signals (e.g., from the processing circuit 120).

For example, FIG. 5 illustrates an example optical element wheel 500 in accordance with one or more embodiments of the present disclosure. The optical element wheel includes light refracting optical elements 505, 510, and 515. It is noted that the ellipses between the optical elements 510 and 515 indicate that one or more additional optical elements are between the optical elements 510 and 515 or no optical elements are present between the optical elements 510 and 515. In some cases, the optical element wheel 500 may be used with the imaging system 100, 200, and/or 400 in FIGS. 1, 2, and 4, respectively. For example, the optical element 505 may be used as the lens 420 of FIG. 4 to move the FOV of the imaging device 410. The processing circuit 425 may swap out the optical element 505 and swap in the optical element 515 such that the FOV of the imaging device 410 is moved by the optical element 515 rather than the optical element 505. The optical element 515 may adjust the FOV of the imaging device 410 differently than the optical element 505 adjusts the FOV of the imaging device 410.

The optical element wheel 500 may also be referred to as a focus wheel or focus distance wheel. In some cases, objects considered to be close may be at a distance of around 500 mm or less from at least one of the imaging devices 405 and/or 410. The optical elements 505, 510, and 515 may be utilized for an object with focus distances 50 mm±10 mm, 70 mm±15 mm, and 500 mm 15 mm, respectively, from the imaging devices 405 and 410. Additional optical elements may be provided in the optical element wheel 500 to accommodate for smaller focus distances, larger focus distances, and/or intermediate focus distances. In some cases, for focus distances higher than those accounted for by the optical element 515, the FOVs of the imaging devices 405 and 410 may not need to be moved for imaging purposes (e.g., using any optical elements), as the objects are at a sufficient distance to be imaged without such FOV movement. In an aspect, the imaging devices 405 and/or 410 may be refocused whenever an optical element(s) is swapped out and/or an optical element(s) is swapped in (e.g., to move the FOV of the imaging devices 405 and/or 410). In some cases, alternative to or in addition to using optical elements and/or reorienting the optical elements (e.g., adjusting a position and/or tilt), the imaging devices 405 and/or 410 may be moved, such as via rotational motion (e.g., tilting) and/or translational motion (e.g., adjusted up and down on a stand shaft).

In an embodiment, imaging devices (e.g., 105, 110) may be built prior to adding (e.g., positioning) a light refracting optical element (e.g., the prism lens 215) in front of one or more of the imaging devices. In this regard, in some aspects, prior to adding the optical element, the imaging devices may be built and calibrated. For example, in some cases, with reference to FIG. 2, the IR imaging device 205 and the visible-light imaging device 210 may be built and calibrated as part of a camera core of the imaging system 200. In this example, manufacturing processes (e.g., performed at an assembly factory) for building the camera core and subsequent calibration processes may be maintained, with the prism lens 215 added on after such building and calibrating. In some cases, the prism lens 215 may be placed in front of or in place of (e.g., replacing) a window of the visible-light imaging device 210. In some cases, the prism lens 215 may be part of an optical element wheel (e.g., 500) together with other optical elements, with these optical elements being swapped in or out of the imaging system.

Figure 6:
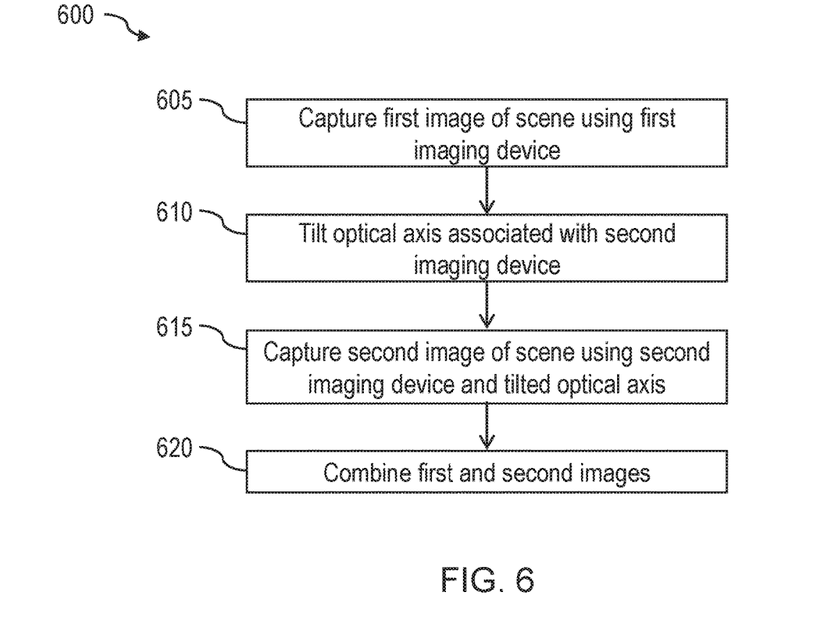
FIGS. 6 and 7 illustrate flow diagrams of example processes for facilitating parallax mitigation in accordance with one or more embodiments of the present disclosure.

FIG. 6 illustrates a flow diagram of an example process 600 for facilitating parallax mitigation in accordance with one or more embodiments of the present disclosure. For explanatory purposes, the example process 600 is primarily described herein with reference to the imaging system 100 shown in FIG. 1; however, the example process 600 is not limited to the imaging system 100. The blocks of example process 600 are described herein as occurring in serial, or linearly (e.g., one after another). However, multiple blocks of example process 600 may occur in parallel. In addition, the blocks of example process 600 need not be performed in the order shown and/or one or more of the blocks of example process 600 need not be performed.

At block 605, a first image of a scene (or portion thereof) is captured using the imaging device 105. At block 610, an optical axis of the imaging device 110 is tilted. In some cases, the optical axis of the imaging device 110 may be tilted such that the tilted optical axis intersects an optical axis of the imaging device 105 at a predetermined distance from the imaging device 105. In one case, the optical axis of the imaging device 110 may be tilted using a lens (e.g., a prism lens). In another case, the optical axis of the imaging device 110 may be tilted by tilting the imaging device 110. At block 615, a second image of the scene (or portion thereof) is captured using the imaging device 110 and the tilted optical axis. In an embodiment, the imaging device 105 may be an IR imaging device and the imaging device 110 may be a visible-light imaging device, or vice versa. At block 620, the first and second images may be combined. In some cases, the first and second images may be combined by the processing circuit 120. The combined image may be provided for storage (e.g., in the memory 125) and/or display to a user (e.g., via the display 130). In some cases, the combined image may be further processed (e.g., NUC processing, spatial and/or temporal filtering) prior to storage and/or display.

Figure 7:
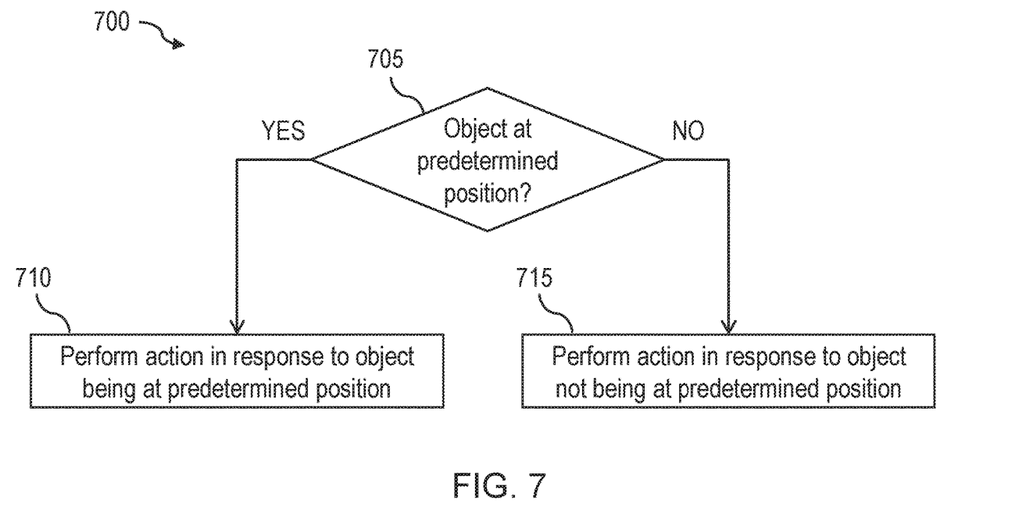

FIG. 7 illustrates a flow diagram of an example process 700 for facilitating parallax mitigation in accordance with one or more embodiments of the present disclosure. For explanatory purposes, the example process 700 is primarily described herein with reference to the imaging system 100 shown in FIG. 1; however, the example process 700 is not limited to the imaging system 100. The blocks of example process 700 are described herein as occurring in serial, or linearly (e.g., one after another). However, multiple blocks of example process 700 may occur in parallel. In addition, the blocks of example process 700 need not be performed in the order shown and/or one or more of the blocks of example process 700 need not be performed. In an embodiment, the process 700 may be performed after block 620 of FIG. 6.

In an embodiment, the scene that is captured may include an object at a predetermined position. For explanatory purposes, the object may be an alignment marker on a chip that can be used to facilitate performing of fabrication operations (e.g., lithography, deposition), although other applications may involve imaging of an object at a predetermined position. At block 705, a determination is made as to whether the object (e.g., 235) is at the predetermined position. In some cases, the determination may be made by the processing circuit 120. The determination may be made based on whether the first image aligns with the second image.

When the object is determined to be at the predetermined position (e.g., within a tolerance level), the process 700 proceeds to block 710. At block 710, an action(s) is performed in response to the object being determined to be at the predetermined position. For example, an action may include providing an indication to a user that the object is at the predetermined position. As another example, an action may include proceeding with performing a fabrication operation.

When the object is determined not to be at the predetermined position, the process 700 proceeds to block 715. At block 715, an action(s) is performed in response to the object being determined to not be at the predetermined position. For example, an action may include providing an indication to a user that the object is not at the predetermined position, such that the user may perform troubleshooting and (if possible) rectify the situation. As another example, an action may include aborting a manufacturing process (e.g., marking the chip as defective). A subsequent manufacturing process may be performed after appropriate adjustments (e.g., to the process and/or associated equipment) are made.

In some embodiments, IR images may be combined with visible-light images. Pixel coordinates of the IR images and visible-light images may be aligned such that pixels of the IR images may be combined with corresponding pixels of the visible-light images. In an example, the IR images and the visible light images may be combined, and the combined images may be analyzed to track objects/features of a scene. In this example, a processing circuit (e.g., 120) may detect and track features of a scene using the visible-light images and convert pixel coordinates of the tracked features in the visible-light images to corresponding pixel coordinates in the IR images, and/or vice versa. In some cases, the combined images may have a higher definition, contrast, and/or detail than that provided by the IR images or visible-light images alone.

Figure 8:
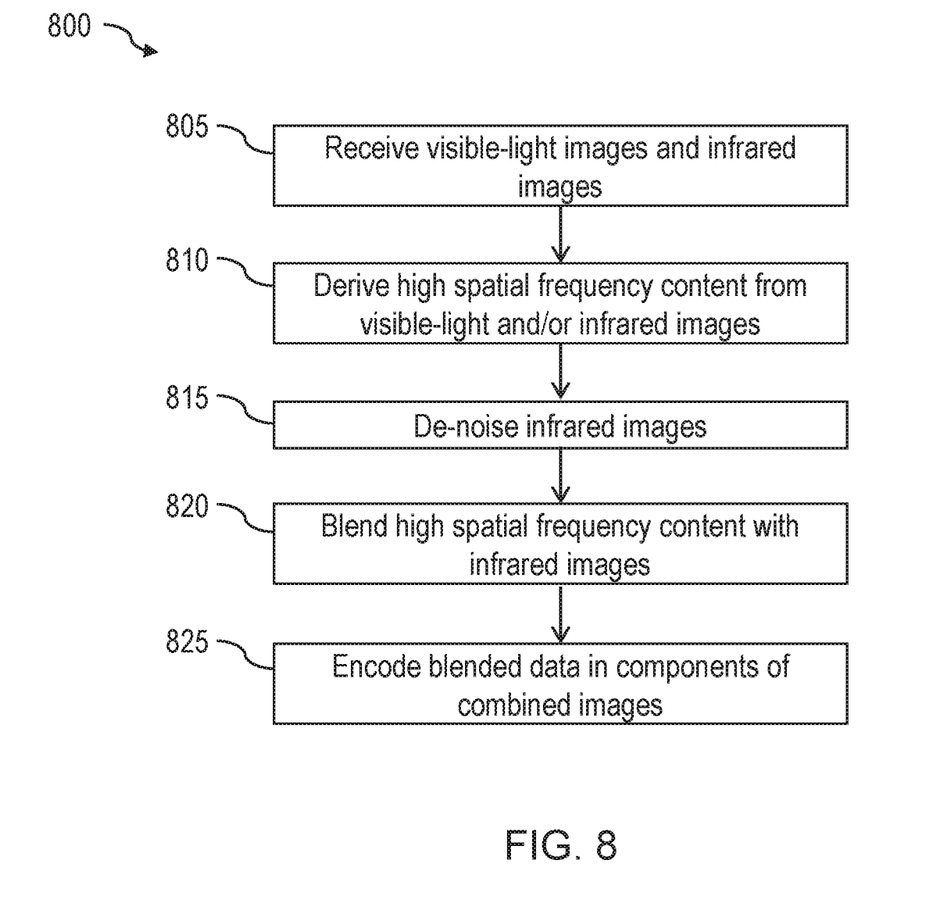
FIG. 8 illustrates an example process for combining infrared and visible-light images in accordance with one or more embodiments of the present disclosure.

The combining operations in accordance with one or more embodiments may be described in further detail with reference, for example, to FIG. 8. FIG. 8 illustrates an example process 800 for combining IR and visible-light images in accordance with one or more embodiments of the present disclosure. For explanatory purposes, the example process 800 is primarily described herein with reference to the imaging system 100 shown in FIG. 1; however, the example process 800 is not limited to the imaging system 100. The blocks of example process 800 are described herein as occurring in serial, or linearly (e.g., one after another). However, multiple blocks of example process 800 may occur in parallel. In addition, the blocks of example process 800 need not be performed in the order shown and/or one or more of the blocks of example process 800 need not be performed. In an embodiment, the process 800 may be performed at or as part of block 620 of FIG. 6.

Although the process described herein in connection with FIG. 8 discusses combining IR images with visible-light images as an example, it should be appreciated that the process may be applied to combining images associated with different portions of the EM spectrum. As an example, in some cases, the process 800 may be utilized for combining thermal images with any suitable non-thermal images (e.g., visible-light images, near IR images, short-wave IR images, EMCCD images, ICCD images, or other non-thermal images).

At block 805, visible-light images and IR images, such as thermal images, may be received by the processing circuit 120. For example, the IR images may be captured by the imaging device 105 and the visible-light images may be captured by the imaging device 110. At block 810, high spatial frequency content from one or more of the visible-light and IR images may be derived from one or more of the visible-light and IR images received at block 805. High spatial frequency content derived according to various aspects may include edge/contour details and/or high contrast pixels extracted from the one or more of the visible-light and IR images, for example.

In one case, high spatial frequency content may be derived from the received images by performing a high pass filter (e.g., a spatial filter) operation on the images, where the result of the high pass filter operation is the high spatial frequency content. In another case, high spatial frequency content may be derived from the received images by performing a low pass filter operation on the images, and then subtracting the result from the original images to get the remaining content, which is the high spatial frequency content. In another case, high spatial frequency content may be derived from a selection of images through difference imaging, for example, where one image is subtracted from a second image that is perturbed from the first image in some fashion, and the result of the subtraction is the high spatial frequency content. For example, optical elements of the imaging device 105 and/or optical elements of the imaging device 110 may be configured to introduce vibration, defocusing, and/or movement artifacts into a series of images captured by one or both of imaging devices 105 and 110.

High spatial frequency content may be derived from subtractions of images such as adjacent images in the series.

In some aspects, high spatial frequency content may be derived from only the visible-light images or the IR images. In other aspects, high spatial frequency content may be derived from only a single visible-light or IR image. In further aspects, high spatial frequency content may be derived from one or more components of the visible-light and/or IR images, such as a luminance component of visible light images, for example, or a radiometric component of IR images. Resulting high spatial frequency content may be stored temporarily (e.g., in the memory 125) and/or may be further processed according to block 820.

At block 815, one or more IR images may be de-noised. For example, the processing circuit 120 may de-noise, smooth, or blur one or more IR images using a variety of image processing operations. In one aspect, removing high spatial frequency noise from the IR images allows the processed infrared images to be combined with high spatial frequency content derived according to block 810 with less risk of introducing double edges (e.g., edge noise) to objects depicted in the combined images.

In one aspect, removing noise from the IR images may include performing a low pass filter (e.g., a spatial and/or temporal filter) operation on the images, where the result of the low pass filter operation is de-noised or processed IR images. In a further aspect, removing noise from one or more IR images may include down-sampling the IR images and then up-sampling the images back to the original resolution.

In another aspect, processed infrared images may be derived by actively blurring the IR images. For example, optical elements may be configured to slightly de-focus one or more IR images captured by the imaging device 105. The resulting intentionally blurred IR images may be sufficiently de-noised or blurred so as to reduce or eliminate a risk of introducing double edges into the combined images. In other aspects, blurring or smoothing image processing operations may be performed by the processing circuit 120 on the received IR images as an alternative or supplement to using optical elements to actively blur the IR images. Resulting processed infrared images may be stored temporarily (e.g., in the memory 125) and/or may be further processed according to block 820.

At block 820, high spatial frequency content may be blended with one or more IR images. For example, the processing circuit 120 may blend high spatial frequency content derived at block 810 with one or more IR images, such as the processed IR images provided at block 815. In one embodiment, high spatial frequency content may be blended with IR images by superimposing the high spatial frequency content onto the IR images, where the high spatial frequency content replaces or overwrites those portions of the IR images corresponding to where the high spatial frequency content exists. For example, the high spatial frequency content may include edges of objects depicted in images of the scene, but may not exist within the interior of such objects. In such embodiments, blended image data may simply include the high spatial frequency content, which may subsequently be encoded into one or more components of combined images, as described with respect to block 825.

For example, a radiometric component of IR images may be a chrominance component of the infrared images, and the high spatial frequency content may be derived from the luminance and/or chrominance components of visible-light images. In this example, combined images may include the radiometric component (e.g., the chrominance component of the thermal images) encoded into a chrominance component of the combined images and the high spatial frequency content directly encoded (e.g., as blended image data but with no infrared image contribution) into a luminance component of the combined images. By doing so, a radiometric calibration of the radiometric component of the IR images may be retained. In similar cases, blended image data may include the high spatial frequency content added to a luminance component of the IR images, and the resulting blended data encoded into a luminance component of resulting combined images.

In other embodiments, high spatial frequency content may be derived from one or more particular components of one or a series of visible-light and/or IR images, and the high spatial frequency content may be encoded into corresponding one or more components of combined images. For example, the high spatial frequency content may be derived from a luminance component of visible spectrum images, and the high spatial frequency content, which in this embodiment is all luminance image data, may be encoded into a luminance component of combined images.

In another embodiment, high spatial frequency content may be blended with IR images using a blending parameter and an arithmetic equation. For example, in one embodiment, the high spatial frequency content may be derived from a luminance component of visible-light images. In such an embodiment, the high spatial frequency content may be blended with a corresponding luminance component of IR image according to a blending parameter and a blending equation to produce blended image data. The blended image data may be encoded into a luminance component of combined images, for example, and the chrominance component of the IR images may be encoded into the chrominance component of the combined images. In embodiments where the radiometric component of the IR images may be their chrominance component, the combined images may retain a radiometric calibration of the infrared images. In other embodiments, portions of the radiometric component may be blended with the high spatial frequency content and then encoded into combined images.

More generally, the high spatial frequency content may be derived from one or more components of visible-light images and/or IR images. In such an embodiment, the high spatial frequency content may be blended with one or more components of the IR images to produce blended image data (e.g., using a blending parameter and a blending equation), and resulting combined images may include the blended image data encoded into corresponding one or more components of the combined images. In some embodiments, the one or more components of the blended data do not have to correspond to the eventual one or more components of the combined images (e.g., a color space/format conversion may be performed as part of an encoding process).

A blending parameter value may be selected by a user or may be automatically determined by the processing circuit 120 according to context or other data, for example, or according to an image enhancement level expected by the imaging system 100. In some embodiments, the blending parameter may be adjusted or refined while combined images are being displayed (e.g., by display 130). In some embodiments, a blending parameter may be selected such that blended image data includes only infrared characteristics, or, alternatively, only visible-light characteristics. A blending parameter may also be limited in range, for example, so as not to produce blended data that is out-of-bounds with respect to a dynamic range of a particular color space/format or a display.

In addition to or as an alternative to the processing described above, processing according to the high contrast mode may include one or more processing steps, ordering of processing steps, arithmetic combinations, and/or adjustments to blending parameters as disclosed in U.S. Pat. No. 9,171,361, which is incorporated herein by reference in its entirety. For example, the following equations may be used to determine the components Y, Cr, and Cb for the combined images with the Y component from the high pass filtered visible-light images and the Cr and Cb components from the IR images.

$$hp\_y\_vis = \text{highpass}(y\_vis)$$

$$(y\_ir, cr\_ir, cb\_ir) = \text{colored}(\text{lowpass}(ir\_signal\_linear))$$

In the above equations, highpass(y_vis) may be high spatial frequency content derived from high pass filtering a luminance component of visible-light images. Colored(lowpass(ir_signal_linear)) may be the resulting luminance and chrominance components of the IR images after the IR images are low pass filtered.

In some embodiments, the IR images may include a luminance component that is selected to be 0.5 times a maximum luminance (e.g., of a display and/or a processing step). In related embodiments, the radiometric component of the thermal images may be the chrominance component of the thermal images. In some embodiments, the y_ir component of the IR images may be dropped and the components of the combined images may be (hp_y_vis, cr_ir, cb_ir), using the notation above.

In another embodiment, the following equations may be used to determine the components Y, Cr, and Cb for combined images with the Y component from the high pass filtered visible light images and the Cr and Cb components from the IR images.

$$comb\_y = y\_ir + \text{alpha} \times hp\_y\_vis$$

$$comb\_cr = cr\_ir$$

$$comb\_cb = cb\_ir$$

The variation of alpha may give the user an opportunity to decide how much contrast is needed in the combined images. With an alpha of close to zero, the IR images alone will be shown, but with a very high alpha, very sharp contours/edges can be seen in the combined images.

Once the high spatial frequency content is blended with one or more IR images, processing may proceed to block 825, where blended data may be encoded into components of the combined images in order to form the combined images. At block 825, the blended data may be encoded into one or more components of the combined images. For example, the processing circuit 120 may encode blended data derived or produced in accordance with block 820 into combined images that increases, refines, or otherwise enhances the information conveyed by either the visible-light or IR images viewed by themselves. In some embodiments, encoding blended image data into a component of combined images may include additional image processing operations, for example, such as dynamic range adjustment, normalization, gain and offset operations, noise reduction, and color space conversions, for instance.

In addition, the processing circuit 120 may encode other image data into combined images. For example, if blended image data is encoded into a luminance component of combined images, a chrominance component of either visible-light images or IR images may be encoded into a chrominance component of combined images. Selection of source images may be made through user input, for example, or may be determined automatically based on context or other data. More generally, in some embodiments, a component of combined images that is not encoded with blended data may be encoded with a corresponding component of visible-light images or IR images. By doing so, a radiometric calibration of thermal images and/or a color space calibration of visible-light images may be retained in the resulting combined images.

Although examples of high frequency fusion are described in the foregoing, other combining (e.g., fusing, blending, mixing, and/or others) techniques may be used for image fusions, as would be understood by one in the art. Various combining techniques can be used in accordance with various embodiments of parallax mitigation described herein to provide combined images even in cases where objects are at a close distance from one or more imaging devices.

Although the foregoing provides examples with dual imaging systems, imaging systems with three or more imaging devices may also be utilized. For example, imaging devices may be moveable and/or may be provided with optical elements (e.g., fixed or moveable) that can move FOVs of one or more of the imaging devices as appropriate to mitigate parallax. The imaging devices may be utilized to capture image data in the same or different portions of the EM spectrum.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

The foregoing description is not intended to limit the present disclosure to the precise forms or particular fields of use disclosed. Embodiments described above illustrate but do not limit the invention. It is contemplated that various alternate embodiments and/or modifications to the present invention, whether explicitly described or implied herein, are possible in light of the disclosure. Accordingly, the scope of the invention is defined only by the following claims.

What is claimed is:

1. A method for facilitating parallax mitigation for a first imaging device and a second imaging device for objects in a scene close to the first imaging device and the second imaging device, the method comprising:
   capturing a first image of the scene using the first imaging device, wherein the first imaging device is associated with a first field of view;

tilting, using a prism lens positioned in front of the second imaging device, a second field of view associated with the second imaging device to obtain a tilted field of view that coincides with the first field of view;

capturing a second image of the scene using the second imaging device and the tilted field of view, wherein the capturing the second image comprises:

receiving, by the prism lens, an incident electromagnetic radiation associated with the scene;

transmitting, by the prism lens, a portion of the incident electromagnetic radiation to the second imaging device; and reflecting, by the prism lens, a portion of the incident electromagnetic radiation, wherein the portion reflected by the prism lens is not received by the second imaging device; and combining, by a processing circuit, the first image and the second image to obtain a combined image.

2. The method of claim 1, wherein:
the first field of view is associated with a first optical axis,
the second field of view is associated with a second optical axis,
the tilted field of view is associated with a tilted optical axis,
the first optical axis is parallel to the second optical axis,
the first optical axis intersects the tilted optical axis at a predetermined distance from the first imaging device, and
the tilted optical axis is not parallel to the first optical axis.

3. The method of claim 2, wherein the first optical axis intersects the tilted optical axis on a surface of the object.

4. The method of claim 1, wherein the first imaging device comprises an infrared imaging device and the second imaging device comprises a visible-light imaging device.

5. The method of claim 1, wherein the first imaging device comprises a visible-light imaging device and the second imaging device comprises an infrared imaging device, and wherein the predetermined focus distance is between 50 mm to 100 mm.

6. An imaging system for facilitating parallax mitigation for the imaging system for objects in a scene close to the imaging system, the imaging system comprising:
a first imaging device configured to capture a first image of the scene, wherein the first imaging device has a first field of view;
a second imaging device configured to capture a second image of the scene using a tilted field of view, wherein the second imaging device has a second field of view;
a prism lens disposed in front of the second imaging device, wherein the prism lens is configured to:
tilt the second field of view to obtain the tilted field of view, wherein the tilted field of view coincides with the first field of view;
receive an incident electromagnetic radiation associated with the scene;
transmit a portion of the incident electromagnetic radiation to the second imaging device; and
reflect a portion of the incident electromagnetic radiation, wherein the portion reflected by the prism lens is not received by the second imaging device; and
a processing circuit configured to combine the first image and the second image to obtain a combined image.

7. The imaging system of claim 6, wherein the prism lens is a first lens, the imaging system further comprising:
an actuator configured to exchange the first lens with a second lens, wherein the second lens is configured to tilt the second field of view to obtain a second tilted field of view,
wherein the second imaging device is configured to capture a third image of the scene using the second tilted field of view.

8. The imaging system of claim 6, wherein:
the first field of view is associated with a first optical axis,
the second field of view is associated with a second optical axis,
the tilted field of view is associated with a tilted optical axis,
the first optical axis is parallel to the second optical axis,
the first optical axis intersects the tilted optical axis at a predetermined distance from the first imaging device, and
the tilted optical axis is not parallel to the first optical axis.

9. The imaging system of claim 6, wherein the first imaging device comprises an infrared imaging device and the second imaging device comprises a visible-light imaging device.

10. The imaging system of claim 6, wherein an angled surface of the prism lens faces the object, and wherein a flat surface of the prism lens faces the second imaging device.

11. The imaging system of claim 6, wherein the object is an alignment marker on a chip.

12. The imaging system of claim 6, wherein the first and second images are captured when the object is at a distance less than 500 mm from at least one of the first imaging device or the second imaging device.

13. The method of claim 1, further comprising determining, by the processing circuit, whether an object in the scene is at a predetermined focus distance based on the combined image.

14. The method of claim 13, further comprising aborting a manufacturing process in response to determining that the object is not at the predetermined focus distance, wherein the object not being at the predetermined focus distance is indicative of a defect associated with the manufacturing process.

15. The method of claim 1, further comprising removing the prism lens away from the front of the second imaging device and refocusing the first and second imaging devices when the prism lens is removed.

16. The method of claim 1, further comprising extracting high spatial frequency content from one of the first image or the second image, wherein the combining comprises combining the high spatial frequency content with a luminance component of the other of the first image or the second image.

17. The method of claim 13, further comprising:
selecting the prism lens from among a plurality of optical elements based on the predetermined focus distance, wherein each optical element is associated with causing a different tilt of the second field of view; and
positioning the prism lens in front of the second imaging device to tilt the second field of view.

18. The method of claim 17, wherein the plurality of optical elements is provided in an optical element wheel.

* * * * *

UNITED STATES PATENT AND TRADEMARK OFFICE
CERTIFICATE OF CORRECTION

PATENT NO. : 10,728,517 B2
APPLICATION NO. : 16/208154
DATED : July 28, 2020
INVENTOR(S) : John Hoglund and Bengt Ehrenkrona Page 1 of 1

It is certified that error appears in the above-identified patent and that said Letters Patent is hereby corrected as shown below:

In the Specification

In Column 3, Line 30, change "ROTC" to --ROIC--

In Column 10, Line 12, remove "2s"

Signed and Sealed this
Seventeenth Day of November, 2020

Andrei Iancu
*Director of the United States Patent and Trademark Office*